United States Patent [19]
Schnackenberg

[11] 3,855,870
[45] Dec. 24, 1974

[54] POWER TRANSMISSION BELT, REINFORCEMENT AND PROCESS

[75] Inventor: Werner D. Schnackenberg, Englewood, Colo.

[73] Assignee: The Gates Rubber Company, Denver, Colo.

[22] Filed: July 2, 1973

[21] Appl. No.: 376,037

[52] U.S. Cl. ................................................. 74/234
[51] Int. Cl. ............................................. F16g 5/00
[58] Field of Search ....................................... 74/234

[56] References Cited
UNITED STATES PATENTS
3,656,359  4/1972  Dorf et al. ............................ 74/234
3,783,705  1/1974  Moogk ................................. 74/234

Primary Examiner—Leonard H. Gerin
Attorney, Agent, or Firm—H. W. Oberg, Jr.; Raymond Fink; Curtis H. Castleman, Jr.

[57] ABSTRACT

A power transmission belt with a tensile section including spirally wound cord, the cord preferably of multiple strands consisting of multi-filament and a plurality of disassociated end portions of filaments extending exteriorly of the cord. A method of processing multi-filament cord to include a plurality of disassociated end portions of filaments extending exteriorly of the cord.

11 Claims, 5 Drawing Figures

PATENTED DEC 24 1974  3,855,870

POWER TRANSMISSION BELT, REINFORCEMENT AND PROCESS

BACKGROUND OF THE INVENTION

Textile cords have long been used as a tensile reinforcement in endless belts, whether they be of the flat or V type. The cords for early belts were spun or twisted from staple fibers such as cotton. The tensile strength of such cords did not reflect the strength of individual fibers but rather the frictional forces which could be achieved by twisting the fibers together. In some cases, and as would be expected, the cords having the greater tensile strength also had longer staple fiber lengths. The ends of many staple fibers projected exteriorly from the textile cord in prickly fashion. It was early theorized that the prickly ends of the staple fibers provided most if not all the bond between the cord and the polymeric material of a belt. The mechanical bond not only retained the cord within the polymeric material but also improved the tension carrying capacity of the cord by increasing the force at which the fibers would slip relatively to each other.

With the advent of synthetic multi-filament cords such as rayon, the load carrying capacity of power transmission belts was greatly improved. It was and currently is theorized that the improved performance results from elimination of staple type fibers with the substitute of filaments that extend continuously throughout the length of the belt thereby excluding filament slip.

While the multi-filament early synthetics greatly improved load carrying performance of an endless belt, they also introduced some problems. Synthetic materials such as rayon were produced in multi-filament fashion and then purposely chopped, combed, oriented and twisted into a synthetic staple cord. The fibers of this synthetic staple were purposely made longer to improve the slip problem between the twisted fibers. Although the twisted staple cord did not have the tensile strength of its corresponding multi-filament counterpart, belts produced with such cord were smoother running because shock loading introduced to the belt could be absorbed by relative movement between staple fibers.

Newer synthetic fibers such as nylon had a more satisfactory modulus which eliminated the need for producing synthetic staple cords for belts where shock loading was a problem. The developments of modern day synthetic materials such as polyester has led the way for producing belts of even higher load carrying capacity than was formerly achieved. Practically all modern day cords used in advanced belts are of the multi-filament continuous type. Introduction of the multi-filament cords introduced a problem with certain types of polymeric materials. The smooth finish of a continuous filament did not define a means for mechanical bonding with polymer. Cords were and presently are treated chemically with agents such as polyisocyanate, to establish a molecular linking between the cord and the polymeric material. Alternatively, cords are coated with adhesives that establish adhesion between the cord and polymeric material of a belt.

Thus, the present belt art takes advantage of continuous multi-filament cords and chemical agents or adhesives to effect power transmission belts having high quality performance.

SUMMARY OF THE INVENTION

In accordance with the invention improved endless belting is provided having a tensile section of spirally wound multi-filament cords in combination with a plurality of disassociated end portions of filaments extending exteriorly of the cord. The disassociated end portions extend exteriorly into the polymeric material of the belt to effect mechanical bonding. The multi-filament cords in combination with multiple end portions extending exteriorly of the belt combine to produce a belt having unexpected improvement in performance. The cord combination is produced by disassociating a plurality of filaments of a synthetically produced multi-filament cord to effect a plurality of end portions extending from and about the cord.

An object of the invention is to produce an endless belt having superior performance qualities with the same materials heretofore used in the belt making art.

Another object of the invention is to define a new belt construction that exhibits superior belt performance when compared to belt structures of similar combinations.

Still another object of the invention is to provide a method for producing tensile cords for belts for the purpose of enhancing power transmission belt performance.

An advantage of the invention is that superior belt performance is achieved using prior art construction materials which are easily, but yet significantly, modified.

These and other objects or advantages of the invention are apparent from the description and drawings in which.

DESCRIPTION OF PREFERRED EMBODIMENTS

Multi-filaments synthetic yarns of continuous lengths are available from a number of manufacturers. The yarn is typically twisted in "S" or "Z" fashion to define individual strands and any number of strands may be twisted together in "S" or "Z" fashion to define what is known in the art as multi-filament cord that is suitable for use as a tensile section in endless belts such as flat belts or V-belts of the power transmission type.

Figure 1:
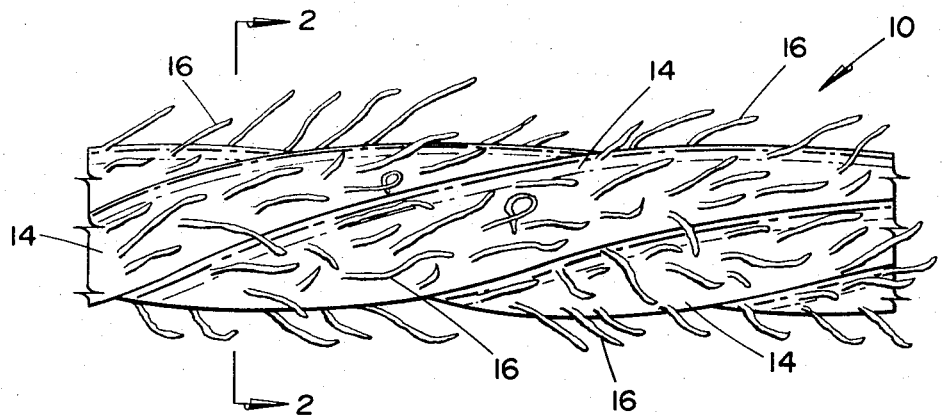
FIG. 1 is a longitudinal side view of a portion of cord of the invention.
Figure 2:
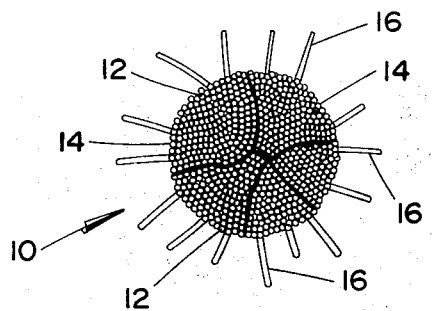
FIG. 2 is a cross-section taken along the line 2—2 of FIG. 1.

Referring to FIGS. 1 and 2, cord 10 of the invention is disclosed which is produced from multi-filament cord as hereinabove described. The cord includes a plurality of filaments 12 which are twisted together to define strands 14. Any number of filaments may be twisted together to define a strand. Similarly, any number of strands may be twisted together to define multi-filament cord such as five strands shown in FIG. 2. The filaments may be of any suitable material such as polyester, rayon, nylon, filaments sold under the trade names of Nomex or Fiber B as manufactured by du-Pont, or any combinations thereof. The belt making art has shown that various combinations or materials may be advantageously twisted together in sequential fashion to effect a cord of suitable modulus and characteristics. In accordance with the invention, a plurality of filaments at the circumferential edge of the strands or cord are purposely disassociated by severing, breaking, cutting, or in general abrading or the like to define a plurality of end portions 16 extending exteriorly of the cord. The disassociated portions 16 resemble staple fibers in appearance but not function. The length of the filament associated with an end portion 16 may be substantially continuous in several inches or feet or yards long, or they may be shorter. The length of a disassociated filament is random. The length depends on the random position of the twisted monofilaments 12 and strands 14 when the filaments are disassociated in accordance with a preferred embodiment of the invention.

A plurality of filaments may be disassociated from multi-filament cord to define a plurality of end portions 16 by sliding multi-filament cord against a tool. The tool may be simple in nature and consist of only a piece of sandpaper, or it may be more sophisticated and include a roughened metal surface, diamond impregnated surface, or have a multitude of surfaces which completely surround the cord. Obviously, the number of end portions disassociated from the cord depends on the tool and the number of times the tool is cycled relative to the strand.

The exteriorly extending end portions 16 may be prepared at any time. However, it is preferred that the end portions be prepared at a late stage in the belt building process to preclude the possibility of the disassociated ends 16 being flattened against the cord 10.

Figure 3:
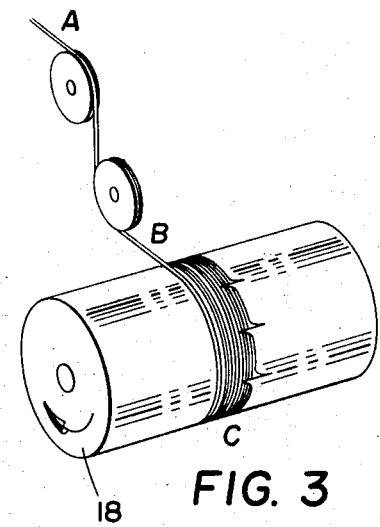
FIG. 3 is a schematical representation showing how cord of the invention can be produced during belt manufacturing processes.

Referring to FIG. 3, a rotatable belt building drum 18 is disclosed. Plies of belt undercord or overcord, with or without reinforcement, and with or without reinforcement matrices may be applied in known fashion on the drum. Cord is spirally wound around the drum in known fashion to effect a tensile reinforcement in a finished belt product. The end portions 16 can be easily disassociated from the cord with an abrading tool at the tensioning festoon A or just prior to winding on the drum at B. Optionally, the cord may be spirally wound on the drum and then an abrading tool moved across the drum at C to effect disassociation of end portions from only one side of the cord. A disadvantage of the latter method is that disassociation end portions 16 are defined on only one side of the cords.

It is standard practice in the art to chemically treat synthetic multi-filament cords with an agent such as polyisocyanate to effect bonding of the cord with a polymeric material used in the belt body. In the case of polymeric materials such as polyurethane, a polyisocyanate agent defines a radical which reacts with the urethane to hypothetically effect molecular bonding of the cord to the urethane. When rubbers are used, an adhesive such as latex solution may be applied to cords treated with polyisocyanate to effect molecular adhesion with the cords, the latex adhers to polymeric materials such as the natural or synthetic rubbers.

The polyisocyanate type cord treating process stiffens the cord and forms a smooth, hard surface on the cord exterior. When such prior art cords are used in power transmission belts, some mechanical bonding takes place between the cord and polymeric material of the belt. Mechanical bonding is only associated with perhaps the interstitial areas between the twisted cord strands and the cords being encapsulated in a polymer. Chemical bonding through an agent or adhesive is the bond chiefly relied on. In preparing cord of the invention, it is preferred to first treat polyester cord with a chemical agent such as a polyisocyanate solution to achieve two preferred cord characteristics. As previously discussed, the treating process stiffens greige muti-filament cord. When multiple end portions 16 are disassociated from the cord 10, the increased stiffness aids in maintaining the disassociated end portions exteriorly of the belt in random fashion for good mechanical bonding rather than allowing them to lie flatly against the cord. Secondly, each exteriorly extending end portion is chemically treated to achieve chemical bonding with a polymeric material.

Figure 4:
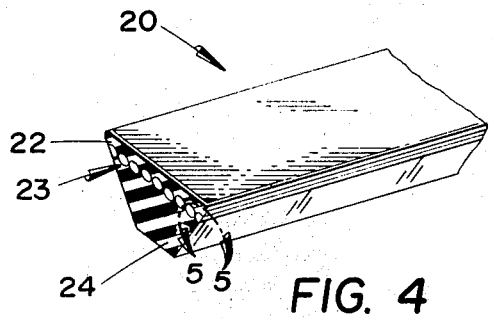
FIG. 4 is an isometric view showing a portion of a V-belt.
Figure 5:
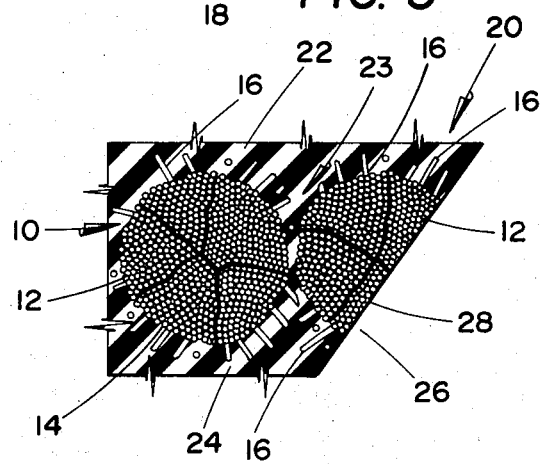
FIG. 5 is an enlargement taken in the area of 5—5 of FIG. 4 showing cords of the invention disposed within a matrix of polymeric material.

Referring to FIGS. 4 and 5, power transmission belting 20 is provided in accordance with the invention that includes an overcord section 22, tensile section 23, and undercord section 24. For purpose of illustration, a power transmission belt of the V-type is depicted. The belt overcord 20 and undercord 24 may be of any desired configuration and include various reinforcements which are well known in the art. The belt polymeric materials are preferably of natural or synthetic rubbers, or polyurethane.

A preferred method for making a liquid cast belt is disclosed in U.S. Pat. No. 3,200,180. Cord 10 of the invention is spirally wound on a cylindrical mold half such as the drum 18 of FIG. 3 and the assembly is placed within another mold half and the resultant mold cavity defined by the mold halves is filled with a castable polymer such as polyurethane. The liquid encapsulates the cord 10 including the plurality of disassociated end portions 16. A molecular bond is theoretically established between the polymer material, cord 10 and the disassociated end portions 16 as they were previously treated with an agent such as polyisocyanate. The end portions 16 of filaments also form a mechanical bond with the polymeric material. After a sleeve of belts are built they are cut into trapezoidal cross-section which bevel cuts 26 the exposed edge cord 28.

When rubber belts are built, the cord is treated with a chemical agent such as polyisocyanate and then dipped into a liquid latex. The cord may be further treated with an adhesive to effect bonding with layers of plied rubber material. The liquid latex dipping process has the advantage of not appreciably distrubing the disassociated end portions 16 of filaments while forming a mechanical bond therewith. If highly viscous materials such as rubber were to be applied directly to the cord, many of the disassociated end portions would be flattened against the cord which would detract from their effectiveness in establishing a mechanical bond.

Based on the prior art, power transmission belts having a multi-filament cord reinforcement should have better performance than belts having a combination of multi-filament and disassociated end portions. This is shown to be particularly true when staple fiber type belt performance is compared to multi-filament type belt performance. However, testing shows that the opposite occurs when a plurality of filament end portions are disassociated from a multi-filament cord in the manner heretofore described. The difference in performance is well illustrated by the following examples.

EXAMPLE I

A sleeve of belts was prepared in accordance with the method of U.S. Pat. No. 3,200,180, wherein half of the belt sleeve had standard or prior art multi-filament cord (Group I) and the second half of the belt sleeve had multi-filament cord with a plurality disassociated ends (Group II) as provided in a manner heretofore described. A plurality of belts were cut from the belt sleeve and the belts from Group I were compared in performance with the belts of Group II. Both belt groups were run on accelerated tests to establish relative belt life. Both belts were run on a standard SAE 3 point water brake test at 14.5 h.p. The belts from Group I ran approximately 100–200 hours whereas the belts from Group II with cords of the invention ran between 450 and 600 hours. Both belts had essentially the same circumference of 1,360 mm, the same top-width of 11 millimeters, and the same number of 50 gauge cords (7).

EXAMPLE II

To compare cord tensile strengths a plurality of 50 gauge cords treated with a polyisocyanate solution were placed in a Tinius Olson tester. The cords had an average tensile strength of 167 pounds. The same type cords were treated in accordance with the invention to disassociate a plurality of end portions. The cords with disassociated end portions displayed tensile strengths between 128.2 and 136 pounds, or an average loss of 21.1 percent in tensile strength. It is estimated that an average of 21.1 percent of the filaments were disassociated from the cord to define end portions.

The foregoing examples clearly show an increase in belt performance when cord of the invention is used although the ultimate tensile load carrying capacity of the cord is decreased by as much as 21 percent. The reason for the improved performance is not totally understood because the load carrying capacity of the tensile section was actually reduced. It is theorized that some of the improved performance is directly associated with the improved mechanical bonding of the tensile members with the polymeric body of the belt. However, the primary increase in performances is believed to be associated with the cut edge cords 26 which appear at the belt sidewall 28. The plurality of disassociated ends extending from the cut edge cord 26 hold it in place and significantly retard it from being pulled loose from the polymeric belt body. The theory is based on past experience which shows that a primary mode of failure is edge cord separation. This is because the edge cords are subjected to higher tensile loading than the center cords as a V-type belt is wedged into a sheave.

The foregoing detailed description is made for purpose of illustration only and is not intended to limit the scope of the invention which is to be determined from the appended claims.

What is claimed is:

1. In a power transmission belt having a body section, the improvement comprising:
   a tensile section of cord disposed in the body section, the cord including twisted multifilaments and a plurality of disassociated filaments defining end portions extending exteriorly of the cord into the body section forming a mechanical bond therewith.

2. A power transmission belt as set forth in claim 1 comprising:
   overcord and undercord sections of castable material which constitutes the body section; and
   spirally wound cord disposed between the overcord and undercord sections and which constitutes the tensile section, the cord treated with a chemical agent that forms a chemical bond between the body section, and cord including exteriorly extending end portions.

3. A power transmission belt as set forth in claim 1 comprising:
   overcord and undercord sections including thermosetting rubber material which constitutes the body section; and
   spirally wound cord disposed between the overcord and undercord and which constitutes the tensile section, the cord treated with a chemical agent and an adhesive, the end portions extending into the adhesive forming a chemical and mechanical bond therewith, and the adhesive forming a bond with the overcord and undercord sections.

4. Cord adapted for use as a tensile member in power transmission belting comprising:
   a plurality of continuous synthetic filaments twisted together to define a strand;
   a plurality of strands twisted together to define a cord;
   a chemical agent applied to the cord; and
   a plurality of random length filaments disassociated from the strands to define a plurality of end portions extending exteriorly of the cord.

5. Cord as set forth in claim 4 wherein the synthetic filaments are polyester.

6. Cord as set forth in claim 4 wherein the chemical agent is a polyisocyanate solution.

7. A power transmission belt of the V-type having bevel cut sidewall portions comprising:
   a body section including overcord and undercord sections;
   a tensile section of spirally wound cord disposed between the undercord and overcord sections, the cord having bevel cut edges exposed at the belt sidewall portions and the cord including a plurality of continuous filaments twisted together to define strands, the strands twisted together to define a cord, and a plurality of filaments disassociated from the cord to define a plurality of filament end portions extending exteriorly into a portion of body section mechanically bonding therewith, the uncut portions of the bevel cut edge cord at least partially mechanically retained in the body section by the filament end portions.

8. A power transmission belt as set forth in claim 7 and further comprising a chemical agent applied to the cord, the agent increasing the bend modulus of the cord and simultaneously effecting chemical bonding between the cord, end portions and body section.

9. A power transmission belt as set forth in claim 7 in which the body portion is at least partially polyurethane.

10. A process for preparing cord for use as a tensile member in power transmission belts, the process of the type having steps of spinning greige continuous synthetic filaments, twisting the filaments into strands, and twisting the strands into multi-filament cords, wherein the improvement comprises the steps of:
- treating the cord with a chemical bonding agent solution;
- disassociating portions of filaments from the cord defining a plurality of filament end portions extending exteriorly from the cord.

11. In a process for making power transmission belts of the type having the steps of chemically treating a multifilament greige cord, spirally winding the cord on a first cylindrical mold half, placing the first mold half within a second cylindrical mold half to define a mold cavity therebetween, and filling the mold cavity with castable material, the improvement comprising, after the step of chemically treating, the steps of:
- abrading the cord, disassociating a plurality of filaments to define a plurality of filament end portions extending exteriorly from the cord; and
- casting material around filament end portions establishing mechanical bonding therewith.

* * * * *